US008951651B2

(12) United States Patent
Sakamoto

(10) Patent No.: US 8,951,651 B2
(45) Date of Patent: Feb. 10, 2015

(54) PERPENDICULAR MAGNETIC RECORDING DISK

(75) Inventor: Kazuaki Sakamoto, Singapore (SG)

(73) Assignee: WD Media (Singapore) Pte. Ltd., Singapore (SG)

( * ) Notice: Subject to any disclaimer, the term of this patent is extended or adjusted under 35 U.S.C. 154(b) by 10 days.

(21) Appl. No.: 13/149,659

(22) Filed: May 31, 2011

(65) Prior Publication Data

US 2012/0141835 A1 Jun. 7, 2012

(30) Foreign Application Priority Data

May 28, 2010 (JP) ................................. 2010-122589

(51) Int. Cl.
G11B 5/66 (2006.01)
G11B 5/73 (2006.01)
(52) U.S. Cl.
CPC .................................. *G11B 5/7325* (2013.01)
USPC ..................................................... 428/831.2
(58) Field of Classification Search
CPC ...... G11B 5/732; G11B 5/7325; G11B 5/738; G11B 5/66
See application file for complete search history.

(56) References Cited

U.S. PATENT DOCUMENTS

| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |

(Continued)

FOREIGN PATENT DOCUMENTS

| JP | 2008-123626 | 5/2008 |
| JP | 2009-140562 | 6/2009 |

(Continued)

OTHER PUBLICATIONS

Japanese Office Action dated May 20, 2014 for related Japanese Application No. 2010-122589 7 pages.

*Primary Examiner* — Holly Rickman

(57) ABSTRACT

[Problem] A perpendicular magnetic disk with an improved SNR and increased recording density by further advancing microfabrication and uniformalization of particle diameters and improving crystal orientation regarding a preliminary ground layer made of a Ni-base alloy is provided.
[Solution] The perpendicular magnetic disk includes: on a base 110, a first Ni alloy layer 142 and a second Ni alloy layer 144; a ground layer 150 having Ru as a main component; and a perpendicular magnetic recording layer 160 containing a CoPt-base alloy and an oxide in this order, the first Ni alloy layer 142 and the second Ni alloy layer 144 including at least one element that takes a bcc crystal structure as a simple substance, and the second Ni alloy layer 144 further including an oxide.

9 Claims, 4 Drawing Sheets

(56) References Cited

U.S. PATENT DOCUMENTS

| | | |
|---|---|---|
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |

(56) References Cited

U.S. PATENT DOCUMENTS

| | | |
|---|---|---|
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2008/0113221 A1* | 5/2008 | Hirayama et al. ............ 428/810 |
| 2009/0117408 A1 | 5/2009 | Umezawa et al. |
| 2009/0136784 A1 | 5/2009 | Suzuki et al. |
| 2009/0147403 A1* | 6/2009 | Araki et al. .................. 360/135 |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |

FOREIGN PATENT DOCUMENTS

| | | |
|---|---|---|
| JP | 2009-245484 | 10/2009 |
| JP | 2009-289361 | 12/2009 |

\* cited by examiner

FIG. 3

(a) COMPARISON AMONG CONCENTRATIONS OF OXIDES

| | COMPOSITION | FILM THICKNESS |
|---|---|---|
| SECOND Ni ALLOY LAYER | (SAMPLE) | 1.5 |
| FIRST Ni ALLOY LAYER | Ni-4W | 7.0 |
| AMORPHOUS ALLOY LAYER | Ni-50Ta | 1.8 |

| SAMPLE | COMPOSITION OF SECOND Ni ALLOY LAYER | SNR |
|---|---|---|
| 1-1 | 96Ni-4W | 16.13 |
| 1-2 | 99(96Ni-4W)-1MgO | 16.43 |
| 1-3 | 95(96Ni-4W)-5MgO | 16.33 |
| 1-4 | 92(96Ni-4W)-8MgO | 16.18 |
| 1-5 | 88(96Ni-4W)-12MgO | 15.76 |

PREFERABLE RANGE : 1mol% ~ 10mol%

(b) COMPARISON AMONG FILM THICKNESSES OF SECOND Ni ALLOY LAYERS

| | COMPOSITION | FILM THICKNESS |
|---|---|---|
| SECOND Ni ALLOY LAYER | 99(Ni-4W)-1MgO | (SAMPLE) |
| FIRST Ni ALLOY LAYER | Ni-4W | 7.0 |
| AMORPHOUS ALLOY LAYER | Ni-50Ta | 1.8 |

| SAMPLE | COMPOSITION OF SECOND Ni ALLOY LAYER | SNR |
|---|---|---|
| 2-1 | 0.8 | 16.18 |
| 2-2 | 1.5 | 16.43 |
| 2-3 | 3.0 | 16.31 |
| 2-4 | 5.0 | 16.21 |
| 2-5 | 7.0 | 15.92 |

PREFERABLE RANGE : 1nm ~ 5nm (c) COMPARISON AMONG CONTENTS OF bcc COMPONENTS OF FIRST Ni ALLOY LAYERS

| | COMPOSITION | FILM THICKNESS |
|---|---|---|
| SECOND Ni ALLOY LAYER | Ni-4W-1MgO | 1.5 |
| FIRST Ni ALLOY LAYER | (SAMPLE) | 7.0 |
| AMORPHOUS ALLOY LAYER | Ni-50Ta | 1.8 |

| SAMPLE | COMPOSITION OF FIRST Ni ALLOY LAYER | $\Delta\theta 50$ |
|---|---|---|
| 3-1 | 100Ni | 2.76 |
| 3-2 | 97Ni-3W | 2.57 |
| 3-3 | 93Ni-7W | 2.52 |
| 3-4 | 90Ni-10W | 2.65 |
| 3-5 | 88Ni-12W | 3.01 |

PREFERABLE RANGE : 3at% ~ 10at%

FIG. 4

(a) STUDY OF bcc COMPONENTS OF FIRST Ni ALLOY LAYERS

| | COMPOSITION | FILM THICKNESS |
|---|---|---|
| SECOND Ni ALLOY LAYER | Ni-4W-1MgO | 1.5 |
| FIRST Ni ALLOY LAYER | (SAMPLE) | 7.0 |
| AMORPHOUS ALLOY LAYER | Ni-50Ta | 1.8 |

| SAMPLE | COMPOSITION OF FIRST Ni ALLOY LAYER | SNR |
|---|---|---|
| 4-1 | 96Ni-4W | 16.43 |
| 4-2 | 96Ni-4Mo | 16.42 |
| 4-3 | 96Ni-4Ta | 16.38 |
| 4-4 | 96Ni-4Cr | 16.40 |
| 4-5 | 96Ni-4V | 16.21 |
| 4-6 | 96Ni-4Nb | 16.05 |
| 4-7 | 96Ni-4B | 16.18 |

PREFERABLE ELEMENTS : W, Mo, Ta, Cr (b) STUDY OF SECOND ADDITIVE ELEMENT TO BE ADDED TO FIRST Ni ALLOY LAYER

| | COMPOSITION | FILM THICKNESS |
|---|---|---|
| SECOND Ni ALLOY LAYER | Ni-4W-1MgO | 1.5 |
| FIRST Ni ALLOY LAYER | (SAMPLE) | 7.0 |
| AMORPHOUS ALLOY LAYER | Ni-50Ta | 1.8 |

| SAMPLE | COMPOSITION OF FIRST Ni ALLOY LAYER | SNR |
|---|---|---|
| 5-1 | Ni-4W | 16.43 |
| 5-2 | 95Ni-4W-1Al | 16.63 |
| 5-3 | 95Ni-4W-1Si | 16.62 |
| 5-4 | 95Ni-4W-1Zr | 16.56 |
| 5-5 | 95Ni-4W-1B | 16.52 |

(c) STUDY OF AMORPHOUS ALLOY LAYER

| | COMPOSITION | FILM THICKNESS |
|---|---|---|
| SECOND Ni ALLOY LAYER | Ni-4W-1MgO | 1.5 |
| FIRST Ni ALLOY LAYER | Ni-4W | 7.0 |
| AMORPHOUS ALLOY LAYER | (SAMPLE) | 1.8 |

| SAMPLE | COMPOSITION OF AMORPHOUS ALLOY LAYER | SNR |
|---|---|---|
| 6-1 | NO | 16.28 |
| 6-2 | 50Ni-50Ta | 16.43 |
| 6-2 | 50Cr-50Ti | 16.37 |
| 6-4 | 50Cr-50Ta | 16.44 |
| 6-5 | Ta | 16.35 |

PERPENDICULAR MAGNETIC RECORDING DISK

TECHNICAL FIELD

The present invention relates to a perpendicular magnetic disk implemented on an HDD (hard disk drive) of a perpendicular magnetic recording type or the like.

BACKGROUND ART

With an increase in capacity of information processing in recent years, various information recording technologies have been developed. In particular, the surface recording density of an HDD using magnetic recording technology is continuously increasing at an annual rate of approximately 50%. In recent years, an information recording capacity exceeding 320 gigabytes per platter has been desired for a magnetic recording medium with a 2.5-inch diameter for use in an HDD or the like. To fulfill such demands, an information recording density exceeding 500 gigabits per square inch is desired to be achieved.

Important factors for increasing recording density of the perpendicular magnetic disk include, for example, an improvement in TPI (Tracks per Inch) by narrowing the track width, ensuring electromagnetic conversion characteristics, such as a Signal-to-Noise Ratio (SNR) and an overwrite (OW) characteristic at the time of improving BPI (Bits per Inch), and further ensuring heat fluctuation resistance with recording bits decreased due to the above. Among these, an increase in SNR in a high recording density condition is important.

In a magnetic layer of a granular structure, which goes mainstream in recent years, a nonmagnetic substance having an oxide as a main component is segregated around magnetic particles having a CoCrPt alloy growing in a columnar shape to form a grain boundary part. In this structure, since the magnetic grains are separated from each other, noise is reduced, and this is effective for a high SNR. An important factor to further increase the SNR is to advance microfabrication of crystal particles and equalize particle diameters (which are collectively referred to as "particle diameter control"), and to improve crystal orientation. Co takes a hcp structure (a hexagonal close-packed crystal lattice structure), and a c-axis direction (an axial direction of a hexagonal column as a crystal lattice) serves as an axis of easy magnetization. Therefore, by orienting the c axis of each of more crystals in a more perpendicular direction, noise is reduced and signals become strong, which can cause an increase in SNR as a synergy effect.

When a film of crystal is formed on crystals by sputtering, as the film thickness is thicker due to epitaxial growth, crystal orientation tends to be improved. Thus, a perpendicular magnetic recording layer is microfabricated and its particle diameter is equalized from an initial growth stage and, in order to improve crystal orientation, it has been conventionally performed that a film of a ground layer (which is also called an intermediate layer) is formed of Ru, which is a metal having a hcp structure, and a film of a perpendicular magnetic recording layer is formed thereon. Furthermore, a crystalline preliminary ground layer (which is also called a seed layer) provided under the Ru ground layer, and crystal orientation of the Ru ground layer is improved.

Patent Document 1 discloses an orientation control layer (a seed layer) having Ni as a main material and having an oxide added thereto. According to Patent Document 1, by using a material added with an oxide as an orientation control layer, the size of magnetic particles can be microfabricated without decreasing magnetic particle density in the magnetic layer. Also, a magnetic layer can be laminated almost without degrading crystal orientation of magnetic grains, and recording and reproducing characteristics of a perpendicular recording medium can also be improved.

PRIOR ART DOCUMENTS

Patent Document

Patent Document 1: Japanese Unexamined Patent Application Publication No. 2009-245484

DISCLOSURE OF INVENTION

Problems to be Solved by the Invention

For For further increasing recording density in the future, the SNR is required to be further increased. As a measure for this, it can be thought that the structure of the preliminary ground layer (the seed layer) is further developed to advance microfabrication of a magnetic layer and equalize its particle diameter and improvement in crystal orientation.

Here, in the technology described in Patent Document 1, by adding an oxide to the preliminary ground layer (the orientation control layer), magnetic particles can be microfabricated without degrading crystal orientation. Thus, an object of the present invention is to provide a perpendicular magnetic disk with an improved SNR and increased recording density by further microfabricating the preliminary ground layer made of a Ni-base alloy and equalizing its particle diameter and improving crystal orientation.

Means for Solving the Problem

To solve the above problem, as a result of studies by the inventor, while an effect of microfabrication can be surely recognized when an oxide is added to the preliminary ground layer, crystal orientation tends to be slightly decreased instead. To get around this, it has been ascertained that orientation can also be improved by forming, on a base side of the preliminary ground layer, a film of another preliminary ground layer without having an oxide, and with further studies, the present invention has been completed.

That is, a typical structure of the perpendicular magnetic disk according to the present invention includes: on a base, a first Ni alloy layer and a second Ni alloy layer; a ground layer having Ru as a main component; and a perpendicular magnetic recording layer containing a CoPt-base alloy and an oxide in this order, the first Ni alloy layer and the second Ni alloy layer including at least one element that takes a bcc crystal structure as a simple substance, and the second Ni alloy layer further including an oxide.

According to the structure described above, crystal orientation can be improved in the first Ni alloy layer, and microfabrication can be achieved in the second Ni alloy layer. While it can be thought that microfabrication can be achieved by adding an oxide to a Ni alloy layer, if a film of a layer containing an oxide is directly formed on an amorphous layer, the effect of improving crystal orientation is small, and therefore the SNR is improved a little. Thus, by achieving microfabrication of the crystals with the second Ni alloy layer containing an oxide and also suppressing a degradation in crystal orientation with the first Ni alloy layer without containing an oxide, the SNR can be improved as a synergy effect.

In particular, by adding an element taking a bcc crystal structure, a lattice constant of the fcc structure of the Ni alloy is adjusted to adjust a connection with the upper Ru ground layer, thereby making it possible to improve crystal orientation of the magnetic layer.

The oxide included in the second Ni alloy layer is preferably in an amount of 1 mole percent or larger and 10 mole percent or smaller. The reason for this is that an effect of improving the SNR cannot be obtained if the value deviates from the above range. The reason for this can be thought such that an effect of microfabrication cannot be obtained. If the value is smaller than 1 mole percent and, by contrast, crystal orientation is degraded if the value is larger than 10 mole percent.

The second Ni alloy layer preferably has a film thickness equal to or larger than 1 nm and equal to or smaller than 5 nm. The reason for this is such that the effect of improving crystal orientation cannot be obtained if the thickness is less than 1 nm and, if the thickness is thicker than 5 nm, crystal particles grow to be large and the effect of microfabrication cannot be obtained.

The element taking the bcc crystal structure included in the first Ni alloy layer and the second Ni alloy layer may be one or plurality of elements selected from W, Mo, Ta, and Cr. By adding at least one element among W, Mo, Ta, and Cr as an element taking a bcc crystal structure, matching in lattice spacing with Ru of the ground layer formed thereon can be achieved, because these elements have an atomic radius larger than that of Ni. Therefore, crystal orientation of the ground layer can be improved, and the SNR can be improved.

The element taking the bcc crystal structure included in the first Ni alloy layer preferably has a content equal to or larger than 3 atomic percent and equal to or smaller than 10 atomic percent. The reason for this is that the effect of crystal orientation cannot be obtained if the content deviates from the above range. The reason for this can be thought such that if the content is smaller than 3 atomic percent, not only an improvement in crystal orientation cannot be obtained but also magnetic noise from Ni as a base material is increased and, if the content is larger than 10 atomic percent, growth of crystal particles of Ni is inhibited.

At least one element from among Al, Si, Zr, and B is preferably further added to the first Ni alloy layer. by adding Al, Si, Zr, and/or B, as a second additional element, microfabrication can be promoted without putting an oxide also into the first Ni alloy layer.

The first Ni alloy layer further preferably has a nonmagnetic amorphous alloy layer included on a base side. With this, irregularities of an interface between the Ni alloy layer and the soft magnetic layer are prevented and crystal orientation can thus be further improved.

Effect of the Invention

According to the present invention, by further advancing microfabrication and uniformalization of particle diameters and improving crystal orientation regarding a preliminary ground layer made of a Ni-base alloy, it is possible to improve the SNR and increase recording density.

BRIEF DESCRIPTION OF DRAWINGS

FIG. 3 Drawings for comparing and describing various components as being changed.

FIG. 4 Drawings for comparing and describing various components as being changed.

BEST MODES FOR CARRYING OUT THE INVENTION

Figure 1:
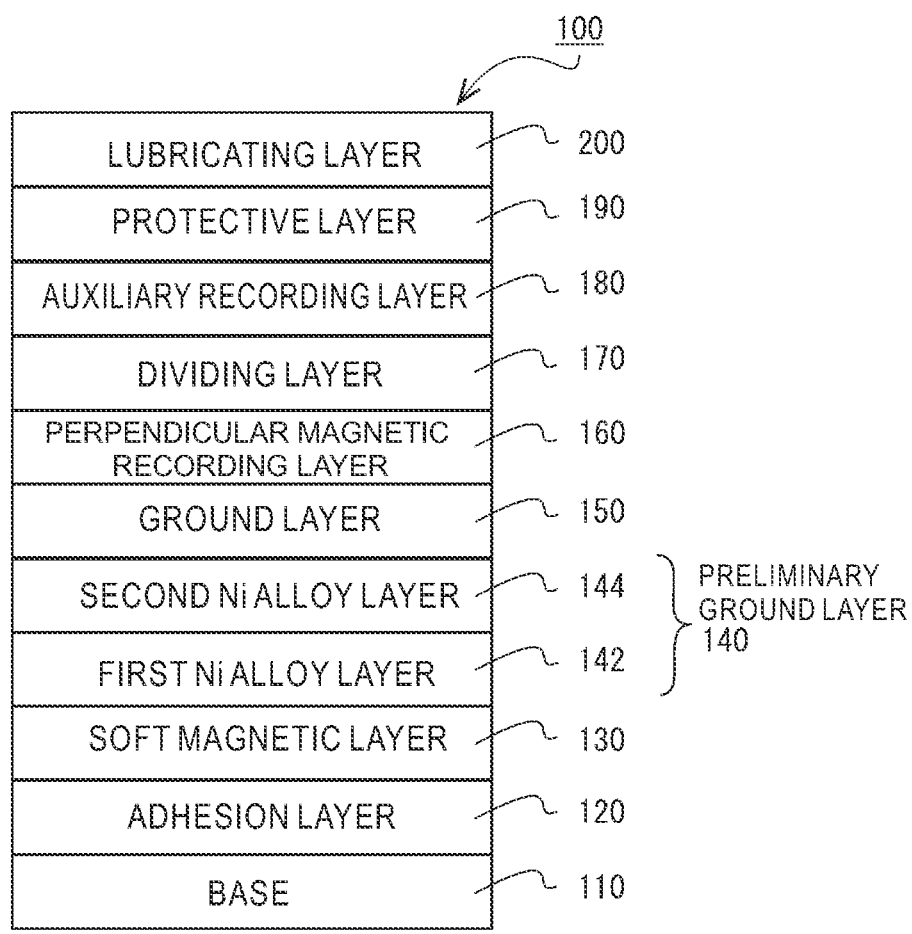
FIG. 1 A diagram for describing a structure of a perpendicular magnetic disk.

In the following, with reference to the attached drawings, preferred embodiments of the present invention are described in detail. The dimensions, materials, and others such as specific numerical values shown in these embodiments are merely examples so as to facilitate understanding of the invention, and are not meant to restrict the present invention unless otherwise specified. Note that, in the specification and drawings, components having substantially the same functions and structures are provided with the same reference character and are not redundantly described, and components not directly relating to the present invention are not shown in the drawings.

(Perpendicular Magnetic Disk)

FIG. 1 is a diagram for describing a structure of a perpendicular magnetic disk 100 according to a first embodiment. The perpendicular magnetic disk 100 depicted in FIG. 1 is configured of a base 110, an adhesion layer 120, a soft magnetic layer 130, a preliminary ground layer 140 (including a first Ni alloy layer 142 and a second Ni alloy layer 144), a ground layer 150, a perpendicular magnetic recording layer 160, a dividing layer 170, an auxiliary recording layer 180, a protective layer 190, and a lubricating layer 200.

As the base 110, for example, a glass disk obtained by molding amorphous aluminosilicate glass in a disk shape by direct pressing can be used. Note that the type, size, thickness, and others of the glass disk are not particularly restricted. Examples of a material of the glass disk include, for example, aluminosilicate glass, soda lime glass, soda aluminosilicate glass, aluminoborosilicate glass, borosilicate glass, quartz glass, chain silicate glass, and glass ceramic such as crystallized glass. By sequentially grinding, polishing, and then chemically strengthening any of these glass disks, the flat, nonmagnetic base 110 formed of a chemically-strengthen glass disk can be obtained.

On the base 110, films of the adhesion layer 120 to the auxiliary recording layer 180 are sequentially formed by DC magnetron sputtering, and a film of the protective layer 190 can be formed by CVD. Thereafter, the lubricating layer 200 can be formed by dip coating. The structure of each layer is described below.

The adhesion layer 120 is formed so as to be in contact with the base 110, and has a function of enhancing a close contact strength between the film of the soft magnetic layer 130 formed thereon and the base 110. The adhesion layer 120 is preferably an amorphous alloy film, such as a CrTi-base amorphous alloy, a CoW-base amorphous alloy, a CrW-base amorphous alloy, a CrTa-base amorphous alloy, or a CrNb-base amorphous alloy. The adhesion layer 120 can have a film thickness, for example, on the order of 2 nm to 20 nm. The adhesion layer 120 may be a single layer, and may be formed by laminating a plurality of layers.

The soft magnetic layer 130 functions as helping facilitate writing of a signal in the magnetic recording layer and increase density by convergence of a write magnetic field from the head when a signal is recorded by a perpendicular magnetic recording scheme. As a soft magnetic material, in addition to a cobalt-base alloy such as CoTaZr, any of materials having soft magnetic characteristics can be used, including an FeCo-base alloy, such as FeCoCrB, FeCoTaZr, or FeCoNiTaZr, and a NiFe-base alloy. Also, by involving a spacer layer made of Ru approximately in the middle of the soft magnetic layer 130, the structure can be configured so as to have AFC (Antiferro-magnetic exchange coupling). With this, perpendicular components of magnetization can be extremely decreased, and therefore noise occurring from the soft magnetic layer 130 can be reduced. In the case of the structure in which a spacer layer is involved, the film thickness of the soft magnetic layer 130 can be such that the spacer layer has a film thickness on the order of 0.3 nm to 0.9 nm and layers thereabove and therebelow made of a soft magnetic material each have a film thickness on the order of 10 nm to 50 nm.

The preliminary ground layer 140 is configured of the first Ni alloy layer 142 and the second Ni alloy layer 144. The preliminary ground layer 140 includes a function of promoting crystal orientation of the ground layer 150 formed thereabove and a function of controlling a microfabricated structure, such as a particle diameter.

The first Ni alloy layer 142 is formed of an Ni-base alloy with a fcc crystal structure (a face-centered cubic structure), has an element taking a bcc crystal structure contained therein, and is oriented in a manner such that a (111) surface is parallel to a main surface of the base 110. The N-base alloy means that the alloy contains Ni as a main component. Note that the main component is a component that is contained most. By adding an element taking a bcc crystal structure to Ni, a lattice constant of the fcc structure of the Ni alloy is adjusted to adjust a connection with the upper Ru ground layer, thereby making it possible to improve crystal orientation of the magnetic layer.

The second Ni alloy layer 144 is formed of an Ni-base alloy with a fcc crystal structure (a face-centered cubic structure), has an element taking a bcc crystal structure contained therein, and is oriented in a manner such that a (111) surface is parallel to a main surface of the base 110. Furthermore, to the second Ni alloy layer 144, an oxide is added. Since the oxide is not solid-soluble in the Ni alloy and but is segregated, the crystals of the second Ni alloy layer 144 can be microfabricated.

Therefore, according to the structure described above, crystal orientation can be improved in the first Ni alloy layer 142, and microfabrication can be achieved in the second Ni alloy layer 144. While it can be thought that microfabrication can be achieved by adding an oxide to a Ni alloy layer, if a film of a layer containing an oxide is directly formed on an amorphous layer, the effect of improving crystal orientation is small, and therefore the SNR is improved a little. Thus, by achieving microfabrication of the crystals with the second Ni alloy layer 144 containing an oxide and also suppressing a degradation in crystal orientation with the first Ni alloy layer 142 without containing an oxide, the SNR can be improved as a synergy effect.

Examples of the element taking a bcc crystal structure contained in the first Ni alloy layer 142 and the second Ni alloy layer 144 can include one or a plurality of elements selected from W, Mo, Ta, and Cr. By adding at least one element among W, Mo, Ta, and Cr as an element taking a bcc crystal structure, matching in lattice spacing with Ru of the ground layer formed thereon can be achieved, because these elements have an atomic radius larger than that of Ni. Therefore, crystal orientation of the ground layer can be improved, and the SNR can be improved. A specific example of the Ni alloy can be suitably selected from NiW, NiMo, NiTa, NiCr, and others. However, "the element taking the bcc crystal structure" is not required to be the same between the first Ni alloy layer 142 and the second Ni alloy layer 144 disk.

The content of the element taking a bcc crystal structure contained in the first Ni alloy layer 142 is preferably equal to or larger than 3 atomic percent and equal to or smaller than 10 atomic percent. The reason for this is that the effect of crystal orientation cannot be obtained if the content deviates from the above range. The reason for this can be thought such that if the content is smaller than 3 atomic percent, not only an improvement in crystal orientation cannot be obtained but also magnetic noise from Ni as a base material is increased and, if the content is larger than 10 atomic percent, growth of crystal particles of Ni is inhibited.

Furthermore, to the first Ni alloy layer 142, at least one element of Al, Si, Zr, and B is preferably added as a second additional element. By adding Al, Si, Zr, and/or B, microfabrication can be promoted without putting an oxide also into the first Ni alloy layer 142.

Examples of the oxide contained in the second Ni alloy layer 144 can include oxides, such as MgO, $SiO_2$, SiO, $TiO_2$, TiO, $Cr_2O_3$, $Zr_2O_3$, $Ta_2O_5$, $Al_2O_3$, $W_2O_5$, $Mo_2O_5$, $V_2O_5$, and $Nb_2O_5$.

The oxide included in the second Ni alloy layer 144 is preferably in an amount of 1 mole percent or larger and 10 mole percent or smaller. The reason for this is that an effect of improving the SNR cannot be obtained if the value deviates from the above range. The reason for this can be thought such that an effect of microfabrication cannot be obtained if the value is smaller than 1 mole percent and, by contrast, crystal orientation is degraded if the value is larger than 10 mole percent.

The second Ni alloy layer preferably has a film thickness equal to or larger than 1 nm and equal to or smaller than 5 nm. The reason for this is such that the effect of improving crystal orientation cannot be obtained if the thickness is less than 1 nm and, if the thickness is thicker than 5 nm, crystal particles grow to be large and the effect of microfabrication cannot be obtained.

Figure 2:
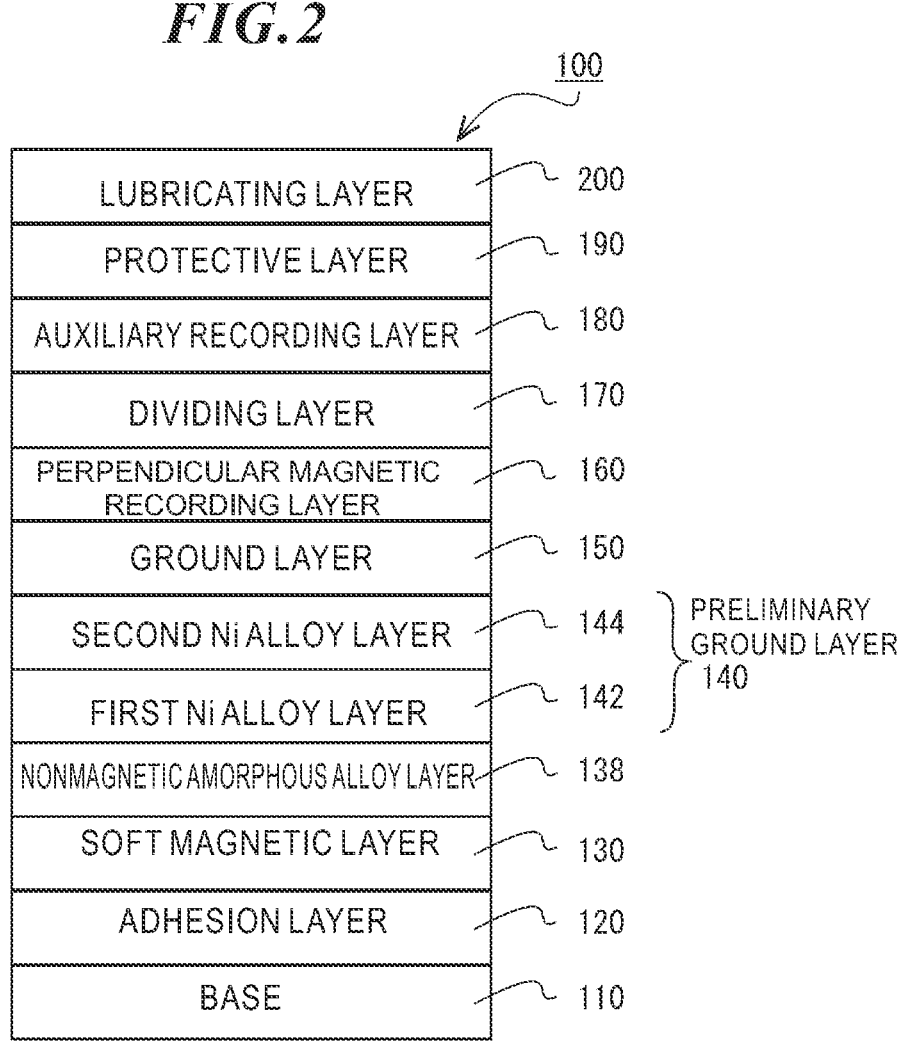
FIG. 2 A diagram for describing another structure of the perpendicular magnetic disk.

Also, as depicted in FIG. 2, a nonmagnetic amorphous alloy layer 138 may further be provided on a base side of the preliminary ground layer 140. FIG. 2 is a diagram for describing another structure of the perpendicular magnetic disk. With this, irregularities of an interface between the Ni alloy layer and the soft magnetic layer are prevented and crystal orientation can thus be further improved. By having Ta contained in the amorphous alloy layer, amorphous properties can be improved, and a film with an extremely flat surface can be formed. To ensure excellent amorphous properties of Ta, 30 atomic percent or more Ta is preferably contained. Specific examples can include NiTa and CiTa. Also, even when a film of the first Ni alloy layer 142 is formed on the amorphous alloy layer 138 containing Ta, flatness is ensured without roughening the interface. With this, irregularity between the Ni alloy layer and the soft magnetic layer can be prevented to further improve crystal orientation.

The ground layer 150 is a layer having a hcp structure, having a function of promoting crystal orientation of magnetic crystal particles in the hcp structure of the perpendicular magnetic recording layer 160 formed thereabove and a function of controlling microfabricated structure, such as a particle diameter, and serving as a so-called basis of a granular structure. Ru has a hcp structure as that of Co, and a lattice space of the crystal is similar to that of Co. Therefore, magnetic particles having Co as a main component can be oriented in good condition. Therefore, as crystal orientation of the ground layer 150 is enhanced, crystal orientation of the perpendicular magnetic recording layer 160 can be improved. Also, by microfabricating the particle diameter of the ground layer 150, the particle diameter of the perpendicular magnetic recording layer can be microfabricated. While a typical material of the ground layer 150 is Ru, a metal, such as Cr or Co, or an oxide can further be added. The ground layer 150 can have a film thickness of, for example, on the order of 5 nm to 40 nm.

Also, by changing gas pressure at the time of sputtering, the ground layer 150 may be formed in a two-layer structure. Specifically, if Ar gas pressure is increased in the case of forming an upper layer side of the ground layer 150 compared with the case of forming a lower layer side, the particle diameter of the magnetic particles can be microfabricated while crystal orientation of the upper perpendicular magnetic recording layer 160 is kept in good condition.

The perpendicular magnetic recording layer 160 has a granular structure in a columnar shape in which a nonmagnetic substance having an oxide as a main component is segregated around magnetic particles with ferromagnetic properties having a Co—Pt-base alloy as a main component to form a grain boundary. For example, by forming a film with the use of a target obtained by mixing $SiO_2$, $TiO_2$, or the like in a CoCrPt-base alloy, $SiO_2$ or $TiO_2$, which is a nonmagnetic substance, is segregated around the magnetic particles (grains) formed of the CoCrPt-base alloy to form a grain boundary, and a granular structure with the magnetic particles growing in a columnar shape can be formed.

Note that the substance for use in the perpendicular magnetic recording layer 160 described above is merely an example, and is not restrictive. As a CoCrPt-base alloy, one or more types of B, Ta, Cu, Ru, and others may be added to CoCrPt. Also, examples of a nonmagnetic substance for forming a grain boundary can include oxides, such as silicon oxide ($SiO_2$), titanium oxide ($TiO_2$), chrome oxide ($Cr_2O_3$), zircon oxide ($ZrO_2$), tantalum oxide ($Ta_2O_5$), cobalt oxide (CoO or $Co_3O_4$). Also, not only one type of oxide but also two or more types of oxide can be combined for use.

The dividing layer 170 is provided between the perpendicular magnetic recording layer 160 and the auxiliary recording layer 180, and has an action of adjusting the strength of exchange coupling between these layers. With this, the strength of a magnetic interaction acting between the perpendicular magnetic recording layer 160 and the auxiliary recording layer 180 and between adjacent magnetic particles in the perpendicular magnetic recording layer 160 can be adjusted. With this, while magnetostatic values, such as Hc and Hn, relating to heat fluctuation resistance are kept, recording and reproduction characteristics, such as an overwrite characteristic and an SNR characteristic, can be improved.

The dividing layer 170 is preferably a layer having a hcp crystal structure and having Ru or Co as a main component so as not to decrease inheritance of crystal orientation. As a Ru-base material, in addition to Ru, a material obtained by adding another metal, oxygen, or an oxide to Ru can be used. Also, as a Co-base material, a CoCr alloy or the like can be used. Specific examples include Ru, RuCr, RuCo, Ru—$SiO_2$, Ru—$WO_3$, Ru—$TiO_2$, CoCr, CoCr—$SiO_2$, CoCr—$TiO_2$, or the like can be used. Note that a nonmagnetic material is normally used for the dividing layer 170, but the dividing layer 170 may have low magnetic properties. Furthermore, in order to obtain excellent exchange coupling strength, the dividing layer 170 may preferably have a film thickness within 0.2 nm to 1.0 nm.

Still further, the dividing layer 170 has an action to the structure to promote separation of the crystal particles of the upper auxiliary recording layer 180. For example, even when the upper layer is made of a material not containing a nonmagnetic substance, such as an oxide, the grain boundary of the magnetic crystal particles can be clarified.

The auxiliary recording layer 180 is a magnetic layer magnetically approximately continuous in an in-plane direction of a main surface of the base. Since the auxiliary recording layer 180 has a magnetic interaction (exchange coupling) with respect to the perpendicular magnetic recording layer 160, magnetostatic characteristics, such as a coercive force Hc and an inverted-magnetic-domain nucleation magnetic field Hn, can be adjusted. With this, an object is to improve heat fluctuation resistance, an overwrite (OW) characteristic, and an SNR. As a material of the auxiliary recording layer 180, a CoCrPt alloy can be used and, furthermore, an additive, such as B, Ta, Cu, or the like, may be added. Specifically, CoCrPt, CoCrPtB, CoCrPtTa, CoCrPtCu, CoCrPtCuB, and others can be used. Furthermore, the auxiliary recording layer 180 can have a film thickness of, for example, 3 nm to 10 nm.

Note that "magnetically continuous" means that magnetic properties continue without interruption. "Approximately continuous" means that the auxiliary recording layer 180 is not necessarily a single magnet when observed as a whole but the magnetic properties may be partially discontinuous. That is, the auxiliary recording layer 180 can have continuous magnetic properties across (so as to cover) a collective body of a plurality of magnetic particles. As long as this condition is satisfied, the auxiliary recording layer 180 may have a structure in which, for example, Cr is segregated.

The protective layer 190 is a layer for protecting the perpendicular magnetic disk 100 from a shock from the magnetic head. The protective layer 190 can be formed by forming a film containing carbon by CVD. In general, a carbon film formed by CVD has an improved film hardness compared with a film formed by sputtering, and therefore is suitable because it can more effectively protect the perpendicular magnetic disk 100 from a shock from the magnetic head. The protective layer 190 can have a film thickness of, for example 2 nm to 6 nm.

The lubricating layer 200 is formed so as to prevent damage on the protective layer 190 when the magnetic head makes contact with the surface of the perpendicular magnetic disk 100. For example, a film can be formed by applying PFPE (perfluoropolyether) by dip coating. The lubricating layer 200 can have a film thickness of, for example, 0.5 nm to 2.0 nm.

First Embodiment

To confirm effectiveness of the above-structured perpendicular magnetic disk 100, the following embodiments and comparative examples are used for description. FIG. 3 and FIG. 4 are drawings comparing and describing various components as being changed.

As an example, on the base 110, by using a vacuumed film forming device, films of the adhesion layer 120 to the auxiliary recording layer 132 were sequentially formed in an Ar atmosphere by DC magnetron sputtering. Note that the Ar gas pressure at the time of film formation is 0.6 Pa unless otherwise specified. For the adhesion layer 120, a film was formed of Cr-50Ti so as to have 10 nm. For the soft magnetic layer 130, films of 92(40Fe-60Co)-3Ta-5Zr were formed so as to interpose a Ru layer of 0.7 nm and each have 20 nm. For the amorphous alloy layer 138, a film of 50Ni-50Ta was formed so as to have 1.8 nm. For the first Ni alloy layer 142, with formation of a film of Ni-4W having 7 nm being taken as a basic structure, the composition and film thickness were changed as described below for comparison. For the second Ni alloy layer 144, with formation of a film of Ni-4W-1MgO having 1.5 nm being taken as a basic structure, the composition and film thickness were changed as described below for comparison. For the ground layer 150, a film was formed of Ru at 0.6 Pa so as to have 10 nm and then a film was formed of Ru at 5 Pa so as to have 10 nm. For the perpendicular magnetic recording layer 160, a film was formed of 90(70Co-10Cr-20Pt)-10($Cr_2O_3$) at 3 Pa so as to have 2 nm and then a film was formed thereon of 90(72Co-10Cr-18Pt)-5($SiO_2$)-5($TiO_2$) at 3 Pa so as to have 12 nm. For the dividing layer 170, a film was formed of Ru so as to have 0.3 nm. For the auxiliary recording layer 180, a film was formed of 62Co-18Cr-15Pt-5B so as to have 6 nm. For the protective layer 190, a film was formed by using $C_2H_4$ by CVD so as to have 4.0 nm, and then its surface layer was nitrided. The lubricating layer 200 was formed by using PFPE by dip coating so as to have 1 nm.

FIG. 3A is a drawing for describing comparisons when the content of MgO of the second Ni alloy layer 144 was changed. A sample 1-1 contained 96Ni-4W (not contain MgO), a sample 1-2 contained 99(96Ni-4W)-1MgO, and the contents of MgO in a sample 1-3 to a sample 1-5 were changed to 5 mole percent, 8 mole percent, and 12 mole percent, respectively. Note that a ratio between Ni and W was set to be constant when the content of MgO was changed.

As depicted in FIG. 3A, compared with the sample 1-1 without addition of MgO, the SNR is improved in the sample 1-2 added with MgO. The reason for this can be thought such that addition of an oxide results in microfabrication of the second Ni alloy layer 144. However, as the samples 1-3 and 1-4, as MgO increases 3 mole percent and 5 mole percent, the SNR gradually decreases. In the sample 1-5 with 12 mole percent MgO, the SNR decreases more than that of the sample 1-1 without addition. The reason for this can be thought such that if the oxide is more than 10 mole percent, by contrast, crystal orientation is degraded. Therefore, it can be found that the oxide contained in the second Ni alloy layer 144 is preferably in an amount of 1 mole percent or larger and 10 mole percent or smaller.

FIG. 3B is a drawing for describing comparisons when the film thickness of the second Ni alloy layer 144 was changed. With the second Ni alloy layer 144 being formed of 99(Ni-4W)-1MgO from all of samples 2-1 to 2-5, their film thicknesses were 0.8 nm, 1.5 nm, 3.0 nm, 5.0 nm, and 7.0 nm, respectively. Compared with the sample 2-1 having the film thickness of 0.8 nm, the SNR is improved in the sample 2-2 having 1.5 nm. However, in the sample 2-3 onward each with a further increased film thickness, the SNR is decreased. In the sample 2-5 having the film thickness of 7.0 nm, the value is lower than that in the sample 2-1. The reason for this can be thought such that as the thickness is thicker than 5 nm, crystal particles grow to be large and the effect of microfabrication cannot be obtained. Therefore, it can be confirmed that the film thickness of the second Ni alloy layer 144 is preferably equal to or larger than 1 nm and equal to or smaller than 5 nm.

FIG. 3C is a drawing for describing comparisons when the content of an element taking a bcc crystal structure in the first Ni alloy layer 142 was changed. With W being used as an element taking a bcc crystal structure in samples 3-1 to 3-6, the contents were 0 atomic percent, 3 atomic percent, 7 atomic percent, 10 atomic percent, and 12 atomic percent. Compared with the sample 3-1 without containing W, the samples 3-2 and 3-3 containing 3 atomic percent and 7 atomic percent W, respectively, crystal orientation ($\Delta\theta50$) is improved. However, in the sample 3-4 with 10 atomic percent, crystal orientation is in a degraded condition and, in the sample 3-5 with 12 atomic percent, $\Delta\theta50$ is decreased more than that in the sample 3-1 without containing W. From this, it can be confirmed that the content of the element taking a bcc crystal structure contained in the first Ni alloy layer 142 is preferably equal to or larger than 3 atomic percent and equal to or smaller than 10 atomic percent.

FIG. 4B is a drawing for describing comparisons when the element taking a bcc crystal structure in the first Ni alloy layer 142 is changed. From samples 4-1 to 4-7, 4 atomic percent W, Mo, Ta, Cr, V, Nb, and B, respectively, are added, each as an element taking a bcc crystal structure. Among these, the SNR was improved when W, Mo, Ta, and Cr were used. The reason for this can be thought such that matching in lattice spacing with Ru of the ground layer 150 formed thereon can be achieved, because these elements have an atomic radius larger than that of Ni.

FIG. 4B is a drawing for describing comparisons when a second additional element to the first Ni alloy layer is changed. No second additional element is included in a sample 5-1. In any of samples 5-2 to 5-5, 95Ni-4W and 1 atomic percent a second additional element are contained. In any of the samples 5-2 to 5-5, the SNR is improved more than that in the sample 5-1. The reason for this can be thought such that, by adding an appropriate amount of Al, Si, Zr, or B, microfabrication can be promoted without putting an oxide also into the first Ni alloy layer 142.

FIG. 4C is a drawing for describing comparisons when the composition of the amorphous ally layer 138 is changed. No amorphous alloy layer 138 was provided in a sample 6-1, and 50Ni-50TA, 50Cr-50Ti, 50Cr-50Ta, and Ta were used in samples 6-2 to 6-5, respectively. In any of the samples 6-2 to 6-5, the SNR is improved more than that in the sample 6-1. The reason for this can be thought such that, by forming a film of the amorphous alloy layer 138, irregularities of an interface between the first Ni alloy layer 142 and the soft magnetic layer 130 are prevented and crystal orientation of the ground layer 150 can thus be further improved.

In the foregoing, the preferred embodiments of the present invention have been described with reference to the attached drawings. Needless to say, however, the present invention is not restricted to these embodiments. It is clear that the person skilled in the art can conceive various modification examples or corrected examples within a range described in the scope of claims for patent, and it is understood that they reasonably belong to the technological scope of the present invention.

INDUSTRIAL APPLICABILITY

The present invention can be used as a perpendicular magnetic disk implemented on an HDD of a perpendicular magnetic recording type or the like.

DESCRIPTION OF REFERENCE NUMERALS

100 . . . perpendicular magnetic disk, 110 . . . base, 120 . . . adhesion layer, 130 . . . soft magnetic layer, 138 . . . amorphous alloy layer, 140 . . . preliminary ground layer, 142 . . . first Ni alloy layer, 144 . . . second Ni alloy layer, 150 . . . ground layer, 160 . . . perpendicular magnetic recording layer, 170 . . . dividing layer, 180 . . . auxiliary recording layer, 190 . . . protective layer, 200 . . . lubricating layer

The invention claimed is:
1. A perpendicular magnetic disk comprising:
a substrate;
on the substrate, a soft magnetic layer; a first Ni alloy layer and a second Ni alloy layer; a ground layer having Ru as a main component; and a perpendicular magnetic recording layer containing a CoPt-base alloy and an oxide in this order, both the first Ni alloy layer and the second Ni alloy layer including at least one element that takes a bcc crystal structure as a simple substance, and the second Ni alloy layer further including a metal oxide, wherein the element taking the bcc crystal structure included in the first Ni alloy layer has a content equal to or larger than 3 atomic percent and equal to or smaller than 10 atomic percent, wherein the second Ni alloy layer has a film thickness equal to or larger than 1 nm and equal to or smaller than 5 nm, and wherein said first Ni alloy layer has a thickness of 7 nm and is greater in thickness than the second Ni alloy layer, being between 1.4 and 7 times thicker than the second Ni-alloy layer.

2. The perpendicular magnetic disk according to claim 1, wherein the oxide included in the second Ni alloy layer is in an amount of 1 mole percent or larger and 10 mole percent or smaller.

3. The perpendicular magnetic disk according to claim 1, wherein the element taking the bcc crystal structure included in the first Ni alloy layer and the second Ni alloy layer is one or plurality of elements selected from W, Mo, Ta, and Cr.

4. A perpendicular magnetic disk comprising:

a substrate;

on the substrate, a soft magnetic layer; a first Ni alloy layer and a second Ni alloy layer; a ground layer having Ru as a main component; and a perpendicular magnetic recording layer containing a CoPt-base alloy and an oxide in this order, both the first Ni alloy layer and the second Ni alloy layer including at least one element that takes a bcc crystal structure as a simple substance, and the second Ni alloy layer further including a metal oxide, wherein at least one metal element from among Al, Si, Zr, and B is further present in the first Ni alloy layer, and wherein as between the first Ni alloy layer and the second Ni alloy layer, the first Ni alloy layer has at least one different chemical element with respect to the second Ni alloy layer.

5. A perpendicular magnetic disk comprising:

a substrate;

on the substrate, a soft magnetic layer, a first Ni alloy layer and a second Ni alloy layer; a ground layer having Ru as a main component; and a perpendicular magnetic recording layer containing a CoPt-base alloy and an oxide in this order, both the first Ni alloy layer and the second Ni alloy layer including at least one element that takes a bcc crystal structure as a simple substance, and the second Ni alloy layer further including a metal oxide, wherein the first Ni alloy layer further has a nonmagnetic amorphous alloy layer provided on a substrate side between the soft magnetic layer and the first Ni alloy layer, said amorphous alloy layer comprising Ta to prevent irregularities at an interface between the soft magnetic layer and the first Ni alloy layer.

6. The perpendicular magnetic disk according to claim 4 or 5, wherein the second Ni alloy layer has a film thickness equal to or larger than 1 nm and equal to or smaller than 5 nm.

7. A perpendicular magnetic disk comprising:

a substrate, a first Ni alloy layer and a second Ni alloy layer; a ground layer having Ru as a main component; and a perpendicular magnetic recording layer containing a CoPt-base alloy and an oxide disposed on the substrate in this order, wherein the first Ni alloy layer and the second Ni alloy layer include at least one element that takes a bcc crystal structure as a simple substance, wherein the second Ni alloy layer further includes an oxide, and wherein the element taking the bcc crystal structure included in the first Ni alloy layer has a content equal to or larger than 3 atomic percent and equal to or smaller than 10 atomic percent, said disk further comprising a soft magnetic layer disposed between said substrate and said first Ni alloy layer, wherein said first Ni alloy layer is in contact with said soft magnetic layer.

8. The perpendicular magnetic disk according to claim 1, wherein said first Ni alloy layer does not have an oxide.

9. The perpendicular magnetic disk according to claim 1, wherein said first Ni alloy layer is more than 4 times greater in thickness than the second Ni alloy layer.

* * * * *